United States Patent
Siemer et al.

(10) Patent No.: US 12,372,652 B2
(45) Date of Patent: Jul. 29, 2025

(54) AUTONOMOUS REACH ENVELOPE INSPECTION SYSTEM FOR AMUSEMENT PARK RIDES

(71) Applicant: Disney Enterprises, Inc., Burbank, CA (US)

(72) Inventors: Francis Michael Siemer, Orlando, FL (US); Aaron Michael Foster, Windermere, FL (US); Gregory Brooks Hale, Orlando, FL (US); Brian Foster Walters, Groveland, FL (US)

(73) Assignee: Disney Enterprises, Inc., Burbank, CA (US)

( * ) Notice: Subject to any disclaimer, the term of this patent is extended or adjusted under 35 U.S.C. 154(b) by 105 days.

(21) Appl. No.: 18/095,425

(22) Filed: Jan. 10, 2023

(65) Prior Publication Data
US 2024/0230905 A1 Jul. 11, 2024

(51) Int. Cl.
| | |
|---|---|
| *G01S 17/88* | (2006.01) |
| *A63G 7/00* | (2006.01) |
| *B64C 39/02* | (2023.01) |
| *B64U 20/80* | (2023.01) |
| *G01S 17/86* | (2020.01) |
| *G05D 1/00* | (2006.01) |

(Continued)

(52) U.S. Cl.
CPC ............ *G01S 17/88* (2013.01); *B64C 39/024* (2013.01); *B64U 20/80* (2023.01); *G01S 17/86* (2020.01); *G05D 1/0202* (2013.01); *G05D 1/0219* (2013.01); *A63G 7/00* (2013.01); *A63G 31/007* (2013.01); *B64U 2101/00* (2023.01); *B64U 2201/10* (2023.01)

(58) Field of Classification Search
None
See application file for complete search history.

(56) References Cited

U.S. PATENT DOCUMENTS

| | | | |
|---|---|---|---|
| 6,163,755 | A | 12/2000 | Peer et al. |
| 9,079,109 | B2 | 7/2015 | Buhler |

(Continued)

FOREIGN PATENT DOCUMENTS

| | | |
|---|---|---|
| CN | 210384825 U | 4/2020 |
| CN | 114063613 A | 2/2022 |

(Continued)

*Primary Examiner* — Tyler J Lee
(74) *Attorney, Agent, or Firm* — Foley & Lardner LLP (57) ABSTRACT

A system for autonomously inspecting intrusions into a reach envelope of a vehicle traveling along a ride path of a park ride. The system includes a test vehicle that travels along the ride path at test speeds. The system includes a reach envelope inspection assembly including a housing supported by the test vehicle. The reach envelope inspection assembly includes a distance measurement assembly in the housing operable to measure distances between the distance measurement assembly and surfaces of the physical environment. The inspection assembly includes a processor executing code to provide an examination program that compares the plurality of distances to one or more predefined reach envelopes to determine whether an intrusion into any of the one or more predefined reach envelopes exists along the ride path. The test vehicle is a ride vehicle for the park ride or an unmanned aerial vehicle (UAV) operated to follow the ride path.

19 Claims, 5 Drawing Sheets

(51) Int. Cl.
*G05D 1/02* (2020.01)
*A63G 31/00* (2006.01)
*B64U 101/00* (2023.01)

(56) References Cited

U.S. PATENT DOCUMENTS

| | | | |
|---|---|---|---|
| 10,040,463 B2 | 8/2018 | Singh | |
| 2009/0272289 A1* | 11/2009 | Baker | A63G 7/00 |
| | | | 104/76 |
| 2010/0326313 A1* | 12/2010 | Baker | A63G 21/08 |
| | | | 104/74 |
| 2015/0055124 A1* | 2/2015 | Buhler | B61K 9/00 |
| | | | 356/72 |
| 2021/0223363 A1 | 7/2021 | Orellana | |
| 2022/0198905 A1* | 6/2022 | Brulo | G01C 3/04 |

FOREIGN PATENT DOCUMENTS

| | | |
|---|---|---|
| EP | 4015337 A1 | 6/2022 |
| WO | 2008017821 A2 | 2/2008 |
| WO | 2012040794 A1 | 4/2012 |

* cited by examiner

EXAMPLE REACH ENVELOPE

AUTONOMOUS REACH ENVELOPE INSPECTION SYSTEM FOR AMUSEMENT PARK RIDES

BACKGROUND

1. Field of the Description

The present description relates, in general, to methods and systems for use performing safety inspections, and, more particularly, to methods and systems for use in confirming, in amusement park rides and other environments where safety envelopes are of concern, that one or more predefined reach envelopes are present such as about a ride vehicle as it moves along a ride path (e.g., moves along a length of track or along a defined path for a trackless attraction).

2. Relevant Background

With any amusement park ride, safety is one of the most important design parameters. Particularly, amusement park rides that involve a passenger vehicle rolling along a track, or along a ride path for a trackless attraction such as a water ride or a dark ride, are designed to maintain a safety envelope about the vehicle along the entire length of the track. For example, safety standards set by a park operator or industry groups may define a reach envelope for rides that define the amount of space that is free of obstacles (e.g., set or theme elements) about the vehicle. This space or volume is often labeled a "reach envelope" (or passenger reach clearance envelope) and may be thought of as defining a distance from a typical passenger position that should be free of any object that may be contacted or "reached" by a passenger as the vehicle carrying the passenger passes along the ride path. Further, the reach or safety envelope may be defined to include areas around the vehicles that should be clear for free and unobstructed movement of the ride vehicles such as is the case for many rotating vehicle rides.

Each ride may have a different reach envelope definition, and a single ride may be designed so that different reach envelope definitions may apply along differing portions of the ride track or along differing portions of the ride path. For example, a dark theme ride may be designed with a track that winds itself through a themed environment or set at a relatively slow pace, and the reach envelope may be relatively small as even if contact is made the danger is comparably low. In contrast, a roller coaster may have stretches of track where the vehicle is moving at very high speeds, and a much larger reach envelope may be used for these stretches of track as no contact between a passenger and ride objects or scenery is allowed. Further, the same roller coaster may have stretches where the speed is reduced and, likewise, the reach envelope may be smaller in these portions of the ride. Further, the vehicle (or seat) design and/or the passenger restraint design may vary so as to allow different amounts of passenger movements (e.g., a shoulder restraint may make it difficult for a passenger to reach outward from a vehicle while a lap restraint may allow a significant amount of passenger movement). These differing vehicle and/or restraint designs may then be paired with differing reach envelopes, with a smaller envelope used when the passenger is more restrained from reaching outward and so on.

Further, a ride designer may wish to apply a number of reach envelopes to the same stretch of track or a ride path and then let differing "obstacles" be present (or absent) in each envelope. For example, a first envelope may be associated with a small or no reach situation (the envelope defines a relatively small distance about the vehicle), a second envelope may be associated with a passenger gently trying to reach out, and a third envelope may be associated with the passenger really trying hard to reach out (e.g., a teenager may push hard to intentionally try to contact a nearby obstacle). The ride may set use differing envelopes based on the ride's intended passengers.

Presently, reach envelope testing or checking is a very cumbersome and inefficient process. One method of checking reach envelopes involves attaching a large wooden template in the shape and size of the clearance envelope to a ride vehicle, e.g., a planar piece of wood may be attached to the center of the vehicle and arranged to be orthogonal to the direction of travel for the vehicle. Then, the vehicle is slowly moved, such as via a winch, through the ride or attraction. When the physical template hits an object, the vehicle is stopped on the track, and the inspectors (which may include the ride designer) visually assess the intrusion into the envelope. This may involve determining whether the object may be within the envelope (an "allowable") or whether the object needs to be removed (e.g., cut away a volume of a tunnel or cave wall for a roller coaster, remove a scenery piece in a dark ride, or the like).

There are a number of problems with using such a reach envelope process to check the design of ride as it is being built. The process is slow and cumbersome in part because the templates are large and they obstruct workers' movements and line of sight around the vehicle. Further, since there are different sizes of clearance zones, the process has to be repeated with different sizes and/or shapes of the templates on the vehicle or the template has to be changed out along differing portions of the track. The current technique also requires the actual ride vehicle to be winched around the track, and the vehicle may weigh several tons such that this can be a challenging process to perform safely in a reasonable amount of time.

In practice, there is normally a detailed verification of the reach envelope at the commissioning or opening of an attraction or park ride and also after modification occur that may affect the reach envelope such as after a maintenance or repair outage. As discussed above for ride design applications, operational verifications of reach envelopes are currently accomplished using a tedious manual process where a reach template is attached to a ride vehicle, and the vehicle is slowly moved through the attraction or park ride along the ride path. In other cases, the reach envelope template is attached to the ride track.

Hence, there remains a need for a more efficient method of verifying operational readiness of an amusement park ride that includes a verification of the safety or reach envelope. Preferably, the new reach envelope inspection method would be designed to be performed automatically to complement the pre-opening procedures to increase safety and to ensure that no objects have been left in the track or in areas encompassed by the rides reach envelope or envelopes. Presently, some ride operators rely on administrative processes or "track walks" to inspect both the track and areas adjacent to the track prior to opening the ride. Further, maintenance personnel may perform specific inspections if there was maintenance work occurring in specific areas of the attraction or park ride. The purposes of the track walk and inspections is, in part, to ensure the track and areas in and adjacent to the reach envelope are clear of obstructions or loose items that could fall into the track or reach envelope during ride operations.

SUMMARY

The present description teaches system (and corresponding method) for verifying a reach envelope(s) of an amusement park ride is free of intrusions or objects. The reach envelope inspection system is designed for use in nearly any amusement park ride (or ride system) including track rides, trackless rides, and rides with self-propelling vehicles and those that utilize gravity such as vehicles in roller coasters and many water rides. To avoid having any dangerous objects intruding on the reach envelope, the inventors determines that the inspection system should include an autonomous reach envelope evaluation assembly or device. Preferably, the assembly or device is configured to be portable and, in some embodiments, to be readily attached to and detached from (if desired) a ride vehicle (such as by clamping onto the vehicle frame or chassis) during the pre-opening cycle. This design would allow its use for the detection of obstructions in the reach envelope before they pose a risk to passengers and would greatly increase passenger safety on a wide variety of attractions or amusement park rides.

During testing or inspection operations, the ride vehicle is typically run along the ride path at the predefined or normal ride speeds, and the autonomous reach envelope evaluation assembly includes a distance measurement assembly that operates as the vehicle travels along the ride path to determine distances from the mounting location of the assembly (or its distance sensor(s)) to the surrounding physical environment. These distance measurements are compared with one or more predefined reach envelopes for the ride being inspected to identify any intrusions or objects present in the reach envelope. The evaluation assembly may be configured to provide inspection results or output at the end of the inspection ride/run of the vehicle along the length of the ride path or during the ride in a live manner. The inspection results, for example, may be provided in a binary manner (e.g., pass/fail, green light/red light, and so on) or may include locations (e.g., track locations and/or locations relative to the vehicle at such track location) of detected intrusions or objects in the reach envelope as well as the amount and/or size of a detected intrusion/object. These results may be provided on the evaluation assembly, which may include a display screen or the like and/or may be provided via an operator's monitoring device (e.g., a graphical user interface (GUI) of a computing device in wired or wireless communication with the evaluation assembly.

The system provides significant advantages over manual clearance envelope checking methods. The system eliminates the need for manually moving (e.g., via winches and the like) a ride vehicle by using the actual ride vehicle, which can be operated under standard operating conditions and ride speeds so as to greatly reduce the time required for the reach envelope inspection. The new system also eliminates the use of large physical templates because with the envelope check system, there is no need to bolt or mount physical wooden templates onto a ride vehicle, and the templates do not need to be changed out during the pull through or test run (e.g., for low speed, middle speed, and high-speed portions of the track). With the template eliminated, there are no (or fewer) physical obstructions to hinder workers (test operators). The system can perform the envelope intrusion examination or test much quicker than the pull-through process, and repeated tests may be easily performed. The system is more accurate in identifying the intruding or clashing areas or objects. The system is also much safer to use for envelope intrusion examination than a process that involves winching an actual or potential ride vehicle that may weigh several tons through a ride or attraction.

More particularly, a system is described herein that is adapted for autonomously inspecting intrusions of a physical environment into a reach envelope of a vehicle traveling along a ride path of a park ride. The system includes a test vehicle configured to travel along the ride path at one or more test speeds. Further, the system includes a reach envelope inspection assembly including a housing supported by the test vehicle. The reach envelope inspection assembly includes a distance measurement assembly in the housing operable to measure a plurality of distances between the distance measurement assembly and surfaces of the physical environment when the test vehicle is moved along the ride path at the one or more test speeds. Further, the reach envelope inspection assembly includes a processor executing code to provide an examination program that compares the plurality of distances to one or more predefined reach envelopes to determine whether an intrusion into any of the one or more predefined reach envelopes exists along the ride path. The test vehicle preferably includes a ride vehicle for the park ride or an unmanned aerial vehicle (UAV) operated to follow the ride path.

In some embodiments, the test vehicle is a ride vehicle for the park ride, and test speeds match ride speeds for the park ride on the ride path (e.g., with an empty vehicle or with an expected load). In other embodiments, the test vehicle is a UAV that is programmed or controlled to autonomously fly along the ride path, e.g., through components and software to maintain the path (e.g., via GPS, IMUs, image tracking, and/or the like). In such embodiments, the UAV may be additionally controlled to slow or hover in response to user input and/or to the examination program determining an intrusion exists in the one or more predefined reach envelopes. Additionally, several drones (e.g., UAVs) may be used to inspect a space. The drone frame(s) may be used to detect objects and could be an enlarged frame, and the drone(s) may be configured to detect if it impacted an object through a tape sensor, accelerometer, or the like.

The system may be implemented with the examination program being configured to provide inspection results indicating whether the one or more predefined reach envelopes are free of any intrusions based on the comparing of the plurality of distances to the one or more predefined reach envelopes (e.g., pass or fail, green light or red light, and so on). In some cases, the distance measurement assembly is configured for scanning a plane orthogonal to a longitudinal axis of the test vehicle and for identifying a location of any determined intrusions in the plane relative to the test vehicle or relative to travel of the test vehicle along the ride path. To this end, the distance measurement assembly may include at least one of a LIDAR sensor, a laser scanner, an ultrasonic distance sensor, a radar sensor, a camera, or other distance measurement sensor configured for distance measurements. Additionally, the examination program may be configured to select one of the one or more predefined reach envelopes for use in the comparison with the plurality of distances based on a location of the test vehicle along the ride path when the plurality of distances were obtained by the distance measurement assembly.

In some useful embodiments, the system also includes a wayside inspection assembly adjacent the ride path including a sensor device for determining presence or absence of an intrusion in one of the one or more predefined envelopes in a section of the ride path. In such embodiments, the sensor device may include or take the form of a camera focused on the section of the ride path. The camera may then be configured with a focal length based on the one of the one or more of the predefined envelopes. Additionally, the wayside inspection assembly may include a light source operable to illuminate at least a portion of the section of the ride path. For example, some embodiments may include an onboard camera assembly (which could also include illumination) for 1) visual identification and evaluation of intrusions detected by the reach envelop system or 2) for automated detailed inspection of equipment, track, structures and other elements along the ride path.

DETAILED DESCRIPTION

The present description is directed toward methods and systems for electronically examining reach envelope intrusion as may be useful for automated inspection of amusement park rides prior to operations or opening (e.g., for determining whether modifications to environs of a ride comply with one or more reach envelopes). In brief, an autonomous reach envelope inspection system or assembly is described herein that is useful with nearly any amusement park ride or attraction in which a ride vehicle follows a ride path and for which safety or reach envelopes are enforced for passenger safety.

The envelope inspection system includes a distance measurement assembly with one or more distance sensors or sensing devices in a housing that is configured to be attached (and detached in some cases) from a ride vehicle (or drone undercarriage in some embodiments). The ride vehicle (or drone) is operated to follow the ride path during the inspection process typically at normal ride speeds, and the distance measurement assembly operates to detect distances from the vehicle (or the assembly mounting point) which can be compared to one or more predefined reach envelopes at particular points along the ride path to determine if there are any objects or intrusions of physical features/objects into the reach envelope. The results of the inspection may include a binary decision (e.g., pass/fail) as to whether or not there were any objects in the reach envelope along the entire ride path and may include a location at which the intrusion was identified and its location relative to the ride path (or ride vehicle traveling on the ride path).

In one useful embodiment, the distance measurement assembly uses one or more LIDAR-based distance sensors or measuring devices that are attached temporarily or permanently to the front or rear of a ride vehicle (e.g., its body, frame, or chassis) to make spatial measurements at many different intervals along the length of the ride path of a park ride (which may be defined by a track or may be trackless). These measurements or distance data to the physical environment surrounding the ride path are used to make real-time or near real-time comparisons to a predefined reach envelope for the ride being inspected for reach envelope compliance. The predefined reach envelope can be a fixed envelope or may vary at each (or one or more) length increment based on an existing envelope that has been verified to be correct by ride engineers/designers.

Operations or maintenance personnel may run the vehicle with the distance measurement assembly (LIDAR-based or other distance measurement devices/sensors) through the ride along the ride path, and a GUI may be generated and operated (such as on a wayside inspection monitoring device of the autonomous reach envelope inspection assembly/ system that has a wireless communication interface to the distance measurement assembly) to indicate to an operator if the reach envelope is clear (e.g., pass/fail the inspection). If obstructions are found, the onboard computer (with its processor running software or executing code to provide the functionality of an envelope inspection program/module) may be configured to track which sections of the track (or ride path) have obstructions. For example, the scene or distance of the intrusion along the track or ride path may be listed in the inspection output report (which is displayed in the GUI) so operations or maintenance personnel can find and remove the obstructions. Rides with movable passenger carrying units/vehicles can have a distance measurement assembly attached to a fixed portion of the ride vehicle chassis or the LIDAR (or other distance measurement) system can be mounted to the movable passenger carrying unit and the motion could be locked out for the inspection run/lap on the ride path so that a consistent measurement can be achieved.

A LIDAR sensor may be used in the distance measurement assembly as it is a well-known distance sensor. However, the distance sensor may be nearly any useful distance sensor, with some types being more useful on different types of rides. For example, the distance sensor may be a LIDAR sensor, a laser scanner, an ultrasonic scanner, a digital camera, and so on. As will be understood by those skilled in the art, it may be useful to combine two or more of these different sensors in a distance measurement assembly such that the assembly can be used on different types of rides.

For example, high-speed scanning may be needed on a high-speed roller coaster but not on a slow-speed dark ride. It is expected that different types of attractions/rides that have different features will benefit from inspection with different sensing approaches. In one implementation, a camera system (e.g., a GoPro or similar camera-based product) may be used in the distance measurement assembly to provide image processing with a fixed focal length video to determine distances (e.g., using processing presently available with iPhone and similar devices with distance measuring applications). This system could also utilize a lighting system or laser projection (e.g., any useful light source) to enhance the accuracy of the image processing for distance measurement by illuminating portions of the physical environment adjacent the vehicle as it travels on the ride path to assist in image capture. Another implementation may use an array with specially designed lenses to achieve focus only in the area within the reach envelope and, hence, to filter objects further than the focal length that would be outside the reach envelope.

In some embodiments, a series of wayside cameras and/or distance measuring devices are included and positioned along the ride path to provide a check or envelop inspection in areas adjacent to the ride path. These wayside devices gather obstruction data in areas of the ride path for which distance data may be difficult to gather with the onboard distance measurement assembly such as lengths or segments of the ride path or ride track in which the vehicle's speeds are high (e.g., a vertical run of a roller coaster ride) or where physical features hinder or block onboard distance measuring sensors from obtaining an unobstructed view. The output data from these wayside devices or wayside inspection system can also be communicated to the inspection monitoring device (or to the onboard assembly and its processor(s)) for use as a combination of data from both onboard and wayside sensors to provide a more complete reach envelope inspection of an entire length of a ride path of an amusement park ride. In this regard, the inspection assembly/system may include an integrated computer for data processing or it could use an offboard computing system where removable media from the distance measure assembly (or its distance sensors such as LIDAR, cameras, or the like) may be used to transfer data while in other cases the data can be transferred wirelessly (e.g., via Wi-Fi, Bluetooth, or other communication protocols).

In some ride vehicles, there may be no or limited available onboard power. In such rides, the autonomous reach envelope inspection assembly/system may be configured to be a self-contained unit. This unit would include a power supply and would be configured (e.g., with a mounting bracket or housing) to be quickly mounted on a vehicle during a pre-opening inspection and then removed after recording distance data and envelope comparisons for one cycle or run along the ride path. This would allow the new inspection assembly/system to be used on attractions that do not have onboard vehicle power (such as many roller coasters, water rides, and the like) and would eliminate the need to add a power supply on the vehicle, which can be expensive or prohibitive due to the added weight.

In some embodiments, the autonomous reach envelope inspection assembly/system includes a drone, which is used to support the distance measurement assembly instead of the ride vehicle. The drone carrying the distance measurement assembly (with its LIDAR sensor, camera, laser scanner, ultrasonic scanner, or other distance measurement sensor/device, with or without data processing) would be flown along the ride path of the ride under inspection on a predefined course (e.g., at a location similar to that provided by mounting on a ride vehicle for the ride). This solution has several advantages compared to the vehicle-based embodiment. It would allow for more high-resolution scanning since the longitudinal speed of the scanning can be controlled whereas on a ride vehicle one often will be limited to the ride design, which does not usually have a speed adjustment (e.g., a gravity zone of a roller coaster or water ride). The use of the drone for inspections can be automated so that the drone with the distance measurement assembly can be deployed by operations, maintenance, or other personnel. This embodiment of the inspection system may include a base station for the drone that would capture the drone and also provide charging through contacts or through inductive or non-contact charging. The base station may be a simple landing zone or it could include a cart or the like that can be rolled into the base station.

Figure 1A:
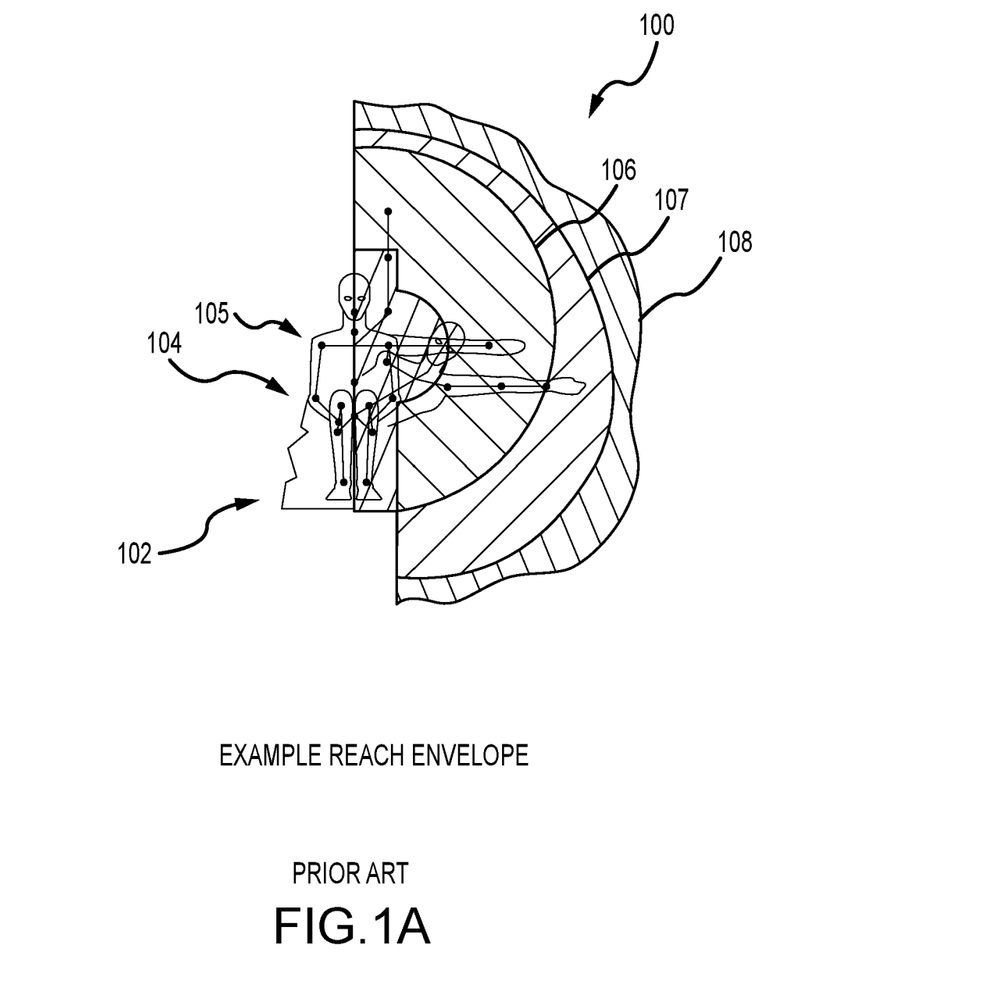
FIGS. 1A and 1B are schematic illustrations of exemplary reach envelope definitions for amusement park rides.
Figure 1B:
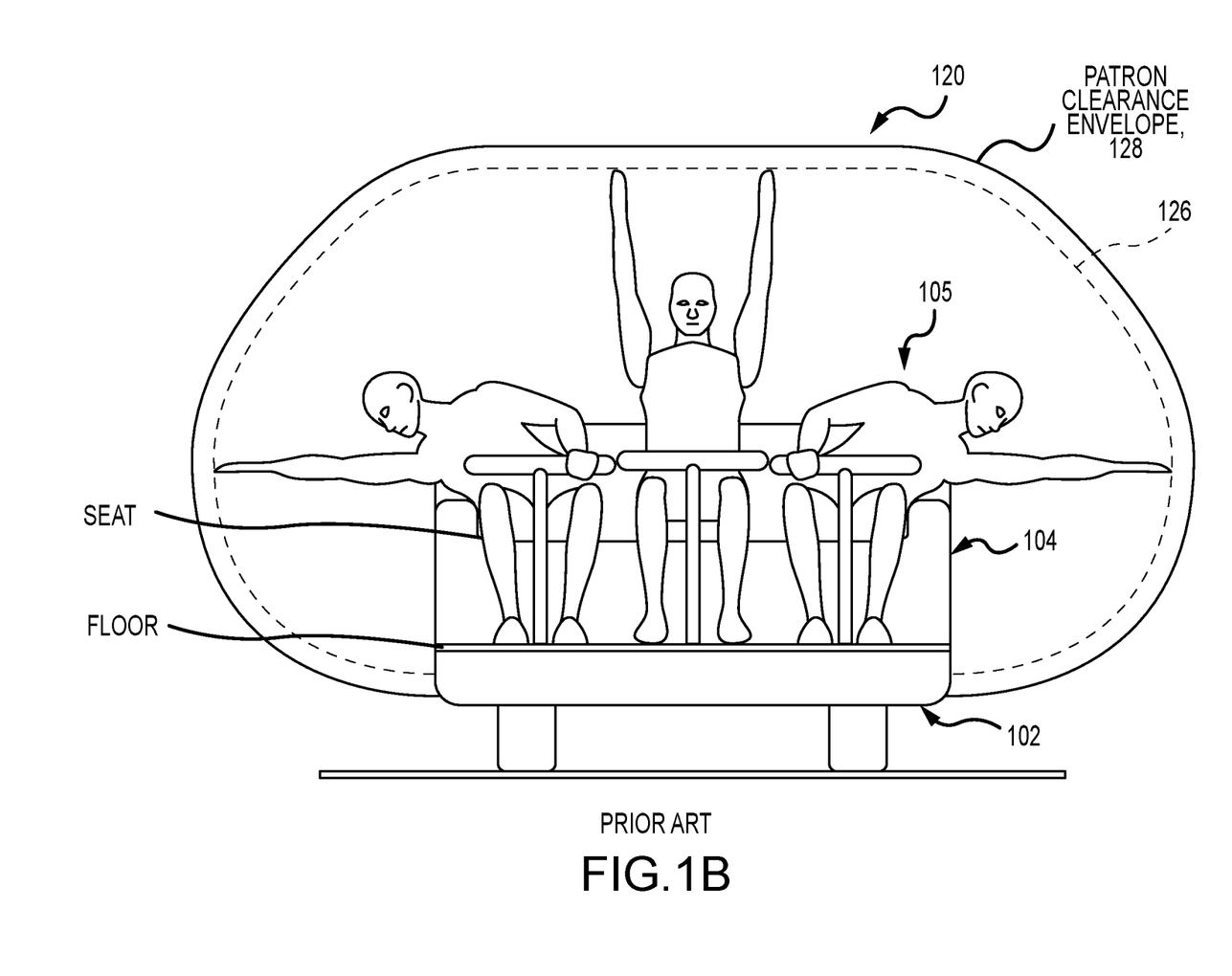

FIGS. 1A and 1B are schematic illustrations 100, 120 of exemplary reach envelope definitions for amusement park rides per two standards (i.e., a company-implemented standard and ASTM-F2291, respectively). As shown, a vehicle chassis/body 102 contains one or more seats 104 in which passengers 105 are seated. The passengers 105 may be a $95^{th}$ percentile male with a particular size and arm reach, which is used to set various safety or reach envelopes relative to the vehicle chassis 102 and/or its seats 104. These may be more and more conservative to suit a particular speed of the vehicle 102 along a ride path (perpendicular to the page containing FIGS. 1A and 1B). This is shown in illustration 100 with a first smaller reach envelope 106, a second intermediate-sized reach envelope 107, and a larger reach envelope 108 (which may include a predefined factor of safety). Likewise, illustration 120 shows the vehicle chassis 102 with seat 104 and passengers 105 in various reach states that are used to define a first safety or reach envelope 126 that may be used for lower speeds of the ride vehicle while a second reach envelope 128 that is larger than envelope 126 may provide additional clearance and, therefore, passenger safety and be used or assigned to segments of a ride path in which a vehicle is expected to be traveling at higher ride speeds.

Figures 2A, 2B:
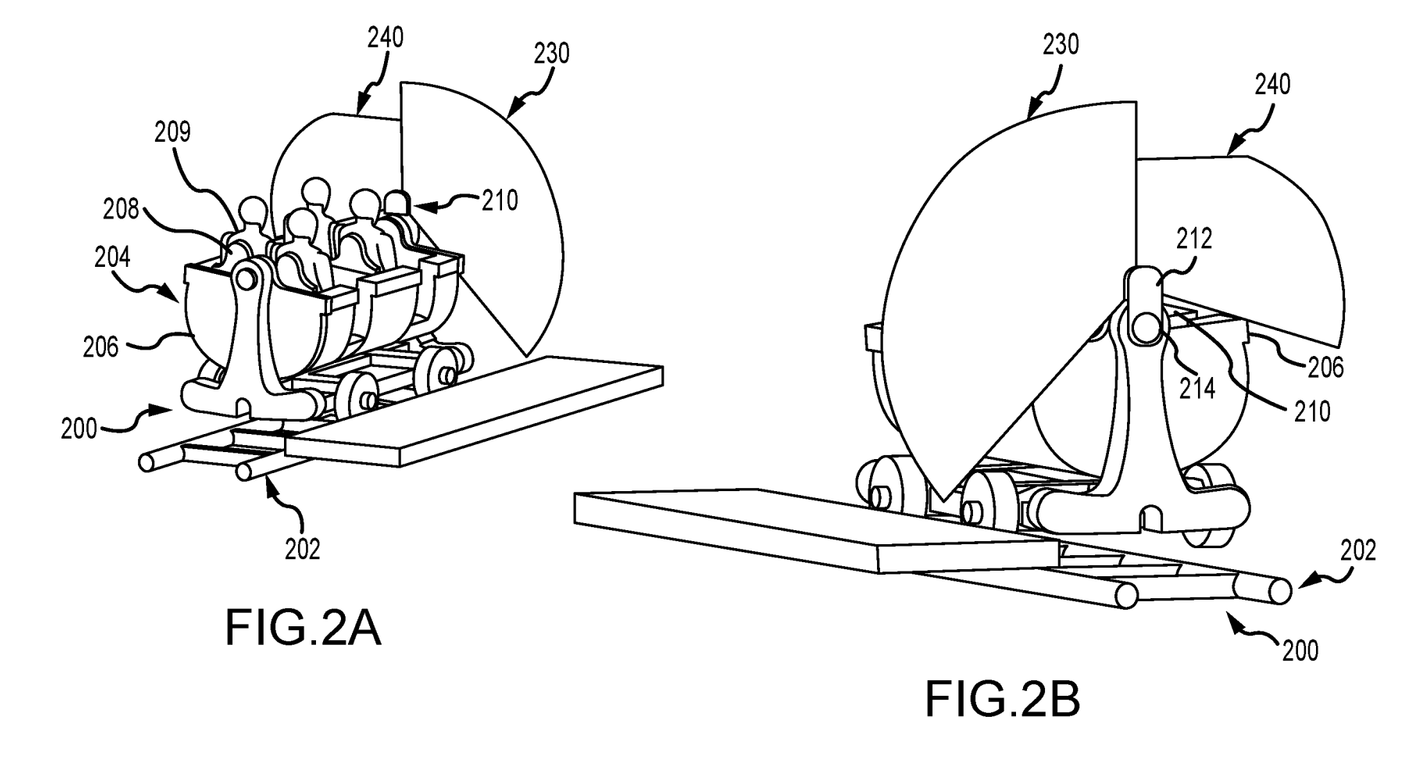
FIGS. 2A and 2B illustrate rear and front perspective views of an amusement park ride modified to include an autonomous reach envelope inspection assembly or system of the present description to inspect or verify two differing reach envelopes.

FIGS. 2A and 2B illustrate rear and front perspective views of an amusement park ride 200 modified to include an autonomous reach envelope inspection assembly or system 210 of the present description to inspect or verify two differing reach envelopes 230 and 240. As shown, the ride 200 is a tracked or track-based ride that includes a track defining a ride path over which a passenger vehicle 204 travels during ride and reach envelope inspection operations. The vehicle 204 may take the form of a roller coaster vehicle as shown with a chassis or body 206 including one-to-many passenger seats 208 in which passengers 209 may be seated during ride operations (but not inspections as those skilled in the arts will readily understand). During ride operations, the vehicle 204 travels along the ride path defined by the track 202 at two or more ride speeds in two or more lengths or segments of the track 202 (or ride path).

The reach envelope inspection assembly 210 is mounted, temporarily or more permanently, to a front portion of the vehicle chassis 206. To this end, the assembly 210 includes a housing 212 that is used to house or support a distance measurement assembly with one or more distance sensors or scanners. The assembly 210 further includes a mounting bracket or frame 214 for affixing the housing 212 to the chassis 206 with a desired orientation to provide the onboard distance sensors/scanners with an unobstructed view of the physical space about the vehicle 204 as it travels along the track 202 and associated ride path.

During envelope inspection operations, the ride vehicle 204 travels along a lap or run of the ride path at the same ride speeds as used or provided during typical operations of the ride 200 with passengers 209 onboard. During this lap or run, the distance sensors/scanners of the assembly 210 operate to collect data useful for determining distances, typically in vertical planes that are orthogonal or nearly so to the ride path, about the vehicle 204. Processors in the housing 212 or offboard in the assembly 210 are used to compare these measured distances or scan field sizes to one or more predefined reach envelopes for one or more lengths of the track 202 and associated ride path. For example, as shown schematically with partial (or half) envelopes 230, 240, two envelopes 230 and 240 may be predefined and assigned to the ride 200 along two different lengths or segments of the ride track 202 and its ride path. The envelope 230 is larger and may be used in segments of the ride track 202 in which the vehicle 204 is traveling below some predefined maximum speed while envelope 240 is smaller than the envelope 230 and may be used in segments of the ride track 202 in which the vehicle 204 travels at speeds above the predefined maximum speed (or at second speeds greater than those allowable for the larger envelope 230).

In practice, location for the vehicle 204 on the track 202 or along the ride path may be fed to the processing components in the assembly 210. In this manner, the envelopes 230 and 240 may be assigned dynamically for envelope inspections based on longitudinal distance travelled by the vehicle 204 and/or by wayside triggers provided in the ride 200 along the track 202. The assembly 210 may use any of a number of different sensors/scanners. In one useful example, the assembly 210 provides a temporarily mounted stand-alone LIDAR scanner that is battery powered (by a battery in the housing 212) as is suited to vehicles 204 with no or little onboard power sources.

Figure 3:
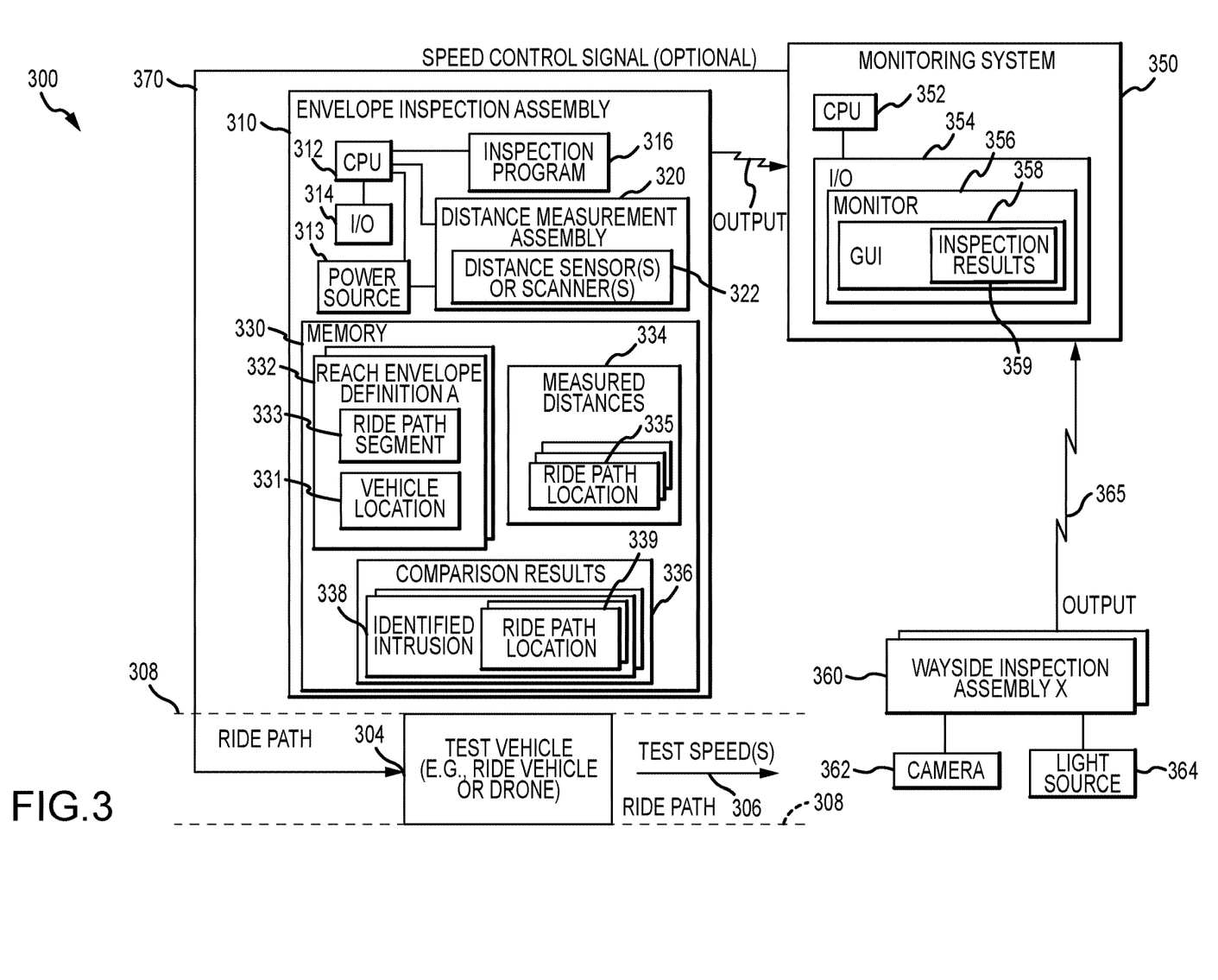
FIG. 3 is a functional block diagram of an autonomous reach envelope inspection system of one embodiment of the present description.

FIG. 3 is a functional block diagram of an autonomous reach envelope inspection system 300 of one embodiment of the present description as may be used within an amusement park ride. The system 300 includes a test vehicle 304 upon which is mounted or supported an envelope inspection assembly 310 (e.g., a housing of the assembly 310 is coupled in a permanent or removable manner with a chassis/body of the vehicle 304 or upon amounting frame of such a vehicle 304). The test vehicle 304 is operated during operation of the system 300 to inspect a reach envelope about the test vehicle 304 to travel at one or more test speeds 306 along a ride path 308 (which may be defined by a track in a park ride or by movements of the vehicle 304 in a trackless ride).

In some embodiments, the test vehicle 304 is a ride vehicle used on the amusement park ride, and, in such embodiments, the test speeds 306 may match ride speeds (e.g., such as when a roller coaster vehicle is run or cycled along the ride path 308 under gravity) such that envelope inspections are performed relatively rapidly when compared with prior manual approaches. In other embodiments, the test vehicle 304 may take the form of an unmanned aerial vehicle (UAV) or drone, and its speed (i.e., test speed 306) may be predefined in a flight plan that causes it to fly along the ride path 308 (e.g., at a predefined height above a ride track or the like). Use of a UAV/drone for test vehicle 304 would allow for automated inspection as drone flights along the ride path, but it may also allow for the drone to be slowed down or even caused to hover (flight speed of zero or nearly so) in response to control signals 370 generated by an operator (not shown) interacting with a monitoring system 350 (e.g., providing user input) when the inspection identifies an intrusion into the reach envelope for the amusement park ride undergoing inspection.

The envelope inspection assembly 310 moves with the test vehicle 304 along the ride path 308 and is configured to operate to verify whether safety or reach envelopes defined for a particular ride are free of intrusions (e.g., a piece of scenery in the envelope, an object such as a power cable handing down from a ceiling into the envelope, and so on). Preferably, the envelope inspection processing is performed onboard the vehicle 304 and in an automated manner. To this end, the assembly 310 is shown to include a processor 312 that manages operations of input and output (I/O) devices 314 (e.g., one or more wireless transceiver or the like) that may be used to communicate as shown with arrow 340 the results or output of an envelope inspection run by the assembly 310 to the monitoring system 350 or removable media 330 may be manually transferred to provide the output 340 to the monitoring system 350. A power source 313 such as a battery or battery pack is provided to power the computing components including the processor 312 as well as the components of a distance measurement assembly 320, which makes the assembly 310 useful on vehicles 304 with no or limited power supplies.

The processor 312 also manages operations and access to and from data storage/memory 330 including executing code or instructions to provide the functions of an inspection program 316. The memory 330 is shown to include (or store) a reach envelope definition (see FIGS. 1A and 1B for example definitions) 332 for one, two, or more portions of the ride path 308 (or a ride track when that defines the path), with a ride path segment or length being associated with each differing definition 332 such as for segments of ride path 308 with ride speeds in a first range and differing segments of the ride path 308 with ride speeds in a second range.

A distance measurement assembly 320 is provided for measuring distances about the vehicle 304 (e.g., in a 180 degree to 360-degree plane or scan field orthogonal to the direction of travel along the ride path 308). To this end, the assembly 320 includes one or more distance sensors or scanners 322. These may take a wide variety of forms to practice the system 300 with some embodiments utilizing LIDAR sensors, laser scanners, ultrasonic scanners, camera or image-based devices, and the like. The output of the measurement assembly 320 is a set of measured distances 334 to the nearby physical environment along the ride path 308, and these distances (or scan fields as shown in FIGS. 2A and 2B) may be saved as shown at 334 in the memory 330 with a ride path location 335 indicating where the measurement was obtained. In this regard, the assembly 310 may be configured to determine or track (such as based on sensed wayside markers (not shown) along the ride path 308) the current location as shown at 331 in memory 330 of the vehicle 304 on the ride path 308 or to receive this data/information from an offboard component (such as monitoring system 350), and this data may be communicated to the assembly 320 or may be linked or assigned to the measured distances 334 by the inspection program 316.

During inspection operations, the inspection program 316 is configured to compare the measured distances 334 against the reach envelope definitions 332 for each ride path segment 333. The results of these comparisons are stored as shown at 336 in memory 330. The results 336 may be binary indicating that the defined envelope in a segment of the ride path is free of intrusions such as with a pass or fail, and a "fail" in any segment of the ride path 308 would be reflected in a "fail" (or intrusion present) result 336 for the inspection run or cycle for the park ride. Further, though, the inspection program 316 may be configured to track each identified intrusion 338 to the safety envelope about the vehicle 304 and provide a ride path location 339 for that intrusion 338 (and, in some cases, a position of the intrusion 338 relative to the vehicle 304 or ride path) based on the vehicle location 331 when the distance measurement 334 was obtained as defined by ride path location data 335.

The monitoring system 350 includes a processor 352 that is configured to manage operations of I/O devices 354 to receive the output 340 of the inspection program 316 including the comparison results 336. The I/O devices 354 may include a display device/monitor 356 that is operated (e.g., by a GUI generator (not shown) run by the processor) to generate and display a GUI 358 to display the inspection results 359, including at least a portion of the output 340 to a human user/operator of the monitoring system 350. These results 359 may be provided after the inspection run in most cases but may be live in others such as when a drone or other vehicle for which speed can be controlled via signals 370 is used as the test vehicle 304.

In some embodiments, the system 300 is adapted to account for blind spots of the distance measurement assembly 320 or locations along the ride path 308 where it may be difficult to obtain quality output 340 from the assembly 310. Specifically, as shown in FIG. 3, the system 300 may include one or more wayside inspection assemblies 360 that are positioned along the ride path 308 (outside any defined safety/reach envelope 332 for that segment 333). Each assembly may include components useful for determining compliance with the reach envelope definition 332 for that ride path section/segment. In some cases, these components will include one or more digital cameras 362 (e.g., a video camera or the like) focused upon the environment surrounding the ride path 308 in the blind spots of the assembly 310, and one or more light sources 364 (e.g., lasers or the like) may be included to illuminate the physical environment along the ride path 308 to facilitate image capture by the camera 362. As discussed above, the camera 362 may be configured to have a focal length (or other filtering apparatus) to only capture images within the reach envelope of the vehicle 304 to identify intrusions and not capture irrelevant (to the envelope inspection) data/imagery. As shown at 365, the assembly 360 is operable or configured to transmit (e.g., in a wireless or wired manner) to the monitoring system 350 for processing and inclusion in the inspection results 359 along with the comparison results 336 provided, in part, by operations of the distance sensors/scanners 322 to provide a more complete reach envelope inspection result.

As discussed above, the inspection system includes one or more scanners mounted upon or supported by the test vehicle (which may be a ride vehicle or a drone) that functions to measure the physical environment adjacent to the test vehicle. For example, a LIDAR sensor, a camera with or without a light source, and/or a laser measurement system or scanner (or multiple scanners) may be mounted upon an upper surface or portion of the chassis of the vehicle or hung below a drone/UAV. The distance measurement sensor/scanner may be positioned such that it scans a vertical plane (e.g., 180 to nearly 360-degree scan) that is orthogonal to the direction of travel of the test vehicle or that is orthogonal to a longitudinal axis of the vehicle chassis (e.g., scans a plane that is coincident with a plane of a physical template in prior envelope checking systems). The output of the scanner(s) is a definition of the real world envelope or size of a void or space as measured in a plane (such as a perpendicular plane) at a particular time, and, as the test vehicle is moved through along the track, a volume is defined through which a ride vehicle will pass as it travels along the track. In other words, the scanner/sensor acts to measure a set of distances to the nearby or adjacent physical environment along the track carrying the test skid and the mounted scanner.

Figure 4:
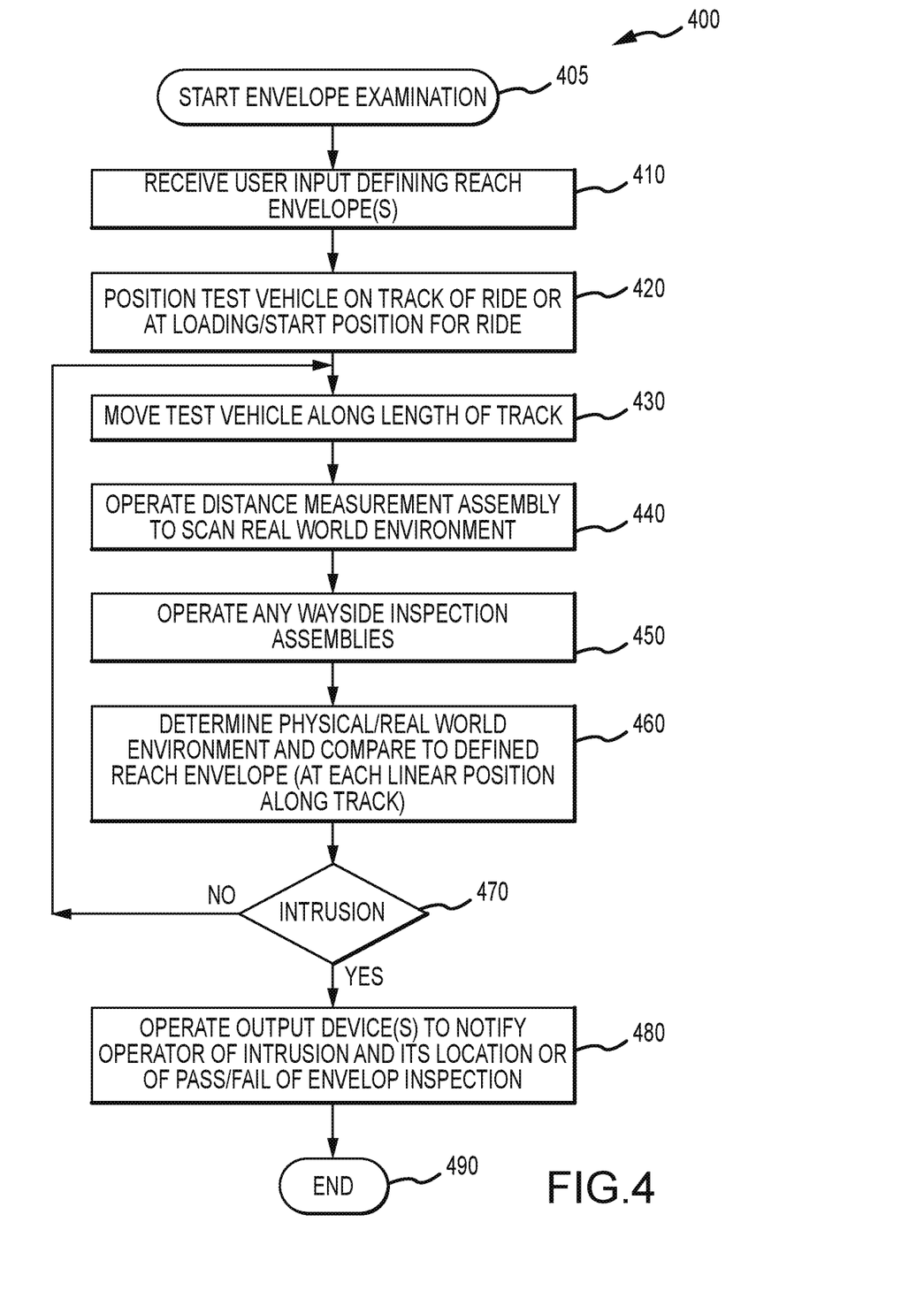
FIG. 4 is a flow diagram of a method for inspecting or examining for intrusion or clashes within a reach envelope (s) of a ride.

FIG. 4 illustrates a method 400 of inspecting or examining for intrusions into a reach envelope along a ride path (which may be defined by a ride track) as may be carried out by operation of the system 300 of FIG. 3. As shown, the method 400 starts at 405 such as with the fabrication of an autonomous reach envelope inspection assembly and loading of software on perform the inspection algorithms/processes described herein including comparing measured distances (or actual existing envelopes) with defined reach envelopes.

The method 400 continues at 410 with receiving or retrieving user input defining reach envelopes for use in the examination for intrusions. These may vary for different segments or lengths of the ride path such as based on ride speeds in such different segments/lengths, as discussed in detail above. Further, at 410, user input may be received or retrieved from memory that defines the vehicle geometry for use in the examination 400 (e.g., seat locations, frame geometry of the vehicle body, and location of wheels/bogies used to ride on track) as well as the mounting location for the inspection assembly housing or the sensors/scanners housed therein. At step 420, the method 400 continues with positioning the test vehicle on the ride path of the ride at or near the starting/loading position for the ride, At step 430, the method 400 continues with moving the test vehicle along the length of track at some predefined test/examination speed(s) with the inspection assembly in operation. When the test vehicle is a ride vehicle for the ride being inspected, the test/examination speeds may match ride speeds at various locations along the ride path (e.g., launch a roller coaster vehicle onto the coaster track and allow it to move at typical ride speeds (loaded or unloaded weights being used)). If a motorized vehicle or drone is used, the ride speeds may be used or the vehicle may be moved at speeds useful for performing scanning of fields about the moving vehicle and may include stopping or slowing if an intrusion or potential intrusion is detected.

Then, at 440, the distance measurement assembly is operated to scan the real-world environment, such as in a vertical plane from a location on top of the chassis of the test vehicle, to determine or measure distances from the distance measurement device(s) of the assembly and vehicle chassis to objects in the surrounding physical environment. Concurrently or sequentially, step 450 may be carried out including operating any available wayside inspection assemblies to obtain inspection results (or intrusion data or imagery) for one or more segments of the ride path such as those in which the onboard distance measurement devices may have difficulty obtaining adequate field scans (e.g., in blind spots for the onboard device(s)).

At 460, the method 400 continues with determining (with the inspection program) the physical or real-world environment based on the scanner data and knowledge of the location of the sensor/scanner on the test vehicle. Step 460 also includes comparing the determined real world environment with a defined reach envelope at this location or section of the ride path. Step 460 may involve comparing the scanned cross section (of the volume of space adjacent to the track or ride path) with the predefined reach envelope associated with that track segment or location. At step 470, the method 400 includes determining whether or not there is an intrusion by the real-world environment into the reach envelope(s) based on the comparison of step 460. If not, the method 200 continues with moving the test skid.

If an intrusion is found, at 480, the method 400 continues with operating the output devices of the inspection assembly to notify an operator of the identified intrusion and its location in the physical environment via their monitoring system. This may involve sounding audible alarms, operating indicator lights, and/or displaying a mapping of the physical environment to the virtual or defined reach envelope at the present location of the test vehicle in the monitoring GUI. The method 400 continues until the ride path has been completely run or inspected. The method 400 may end at 490 or continue at step 430 with further movement of the test vehicle along the ride track. A final performance of step 480 may include providing an indication of whether the ride passed or failed the envelope inspection, with even one intrusion typically resulting in a failure (or "Fail") and with a location of the intrusion often being reported within the inspection results.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The inspection system and methods described herein provide numerous advantages and useful features when compared with prior manual approaches using envelope templates or requiring winching a vehicle along a track. The inspection system allows for and enables more frequent inspections to be performed, and the inspections can readily be performed by local operations/maintenance teams. The inspection system is user friendly in that it is autonomous once reach envelope definitions are loaded or provided for use in comparisons with measured distances to nearby objects or intrusions. The assembly can be configured for attachment to a ride vehicle at a selected location, and, in some cases, the vehicle chassis may be modified to include a holder or receiver for the assembly to ensure it is properly aligned and/or at a known location on the ride vehicle during inspection cycles/runs. The inspection can be performed at normal ride speeds, which make the inspection significantly faster than any prior inspection device or method, and the results may be easy to understand such as pass/fail, green light/red light, and so on. Upon an inspection failure, though, the inspection results may further include intrusion details such as ride path location and location relative to the ride path or ride track to facilitate removal of the intrusion.

The present description has emphasized the use of the concepts for providing safety inspections in an amusement park ride. However, the concepts described herein may be used in all forms of systems needing reach or clearance envelop inspection or verification, especially where the clearance may change due to not just equipment or object in the envelopment, but where surrounding trees, foliage and landscape can change due to growth, weather conditions, landslides, and the like. The reach envelope inspections may be used for, in addition to amusement park rides as described above: (1) passenger transportation vehicles on a track (trains, monorails, trolleys, and other passenger carrying vehicles on a track; (2) passenger transportation systems on a cable (chairlifts, cable cars, transportation rail systems, mining rail systems, and so on); (3) amusement rides not on a track (zip lines, bungee rides, sling-shot rides, boat rides, free ranging vehicles, and so on); (4) aircraft on runways, taxiways, through hangers, and so on (e.g., the path could be checked prior to movement of the aircraft into a congested area, such as a hanger); and (5) over the road equipment and trucks carrying oversized loads (e.g., as could do a pre check for clearance under bridges, power lines, traffic lights, parking garages, and so on using the techniques described herein.)

We claim:

1. A system for inspecting intrusions into a reach envelope of a ride vehicle of a park ride, the system comprising:
    a test vehicle configured to travel along a ride path at one or more test speeds; and
    a reach envelope inspection assembly comprising a distance measurement assembly and a processor,
    wherein the distance measurement assembly is configured to measure a plurality of distances between the distance measurement assembly and surfaces of a physical environment of the park ride while the test vehicle travels along the ride path at the one or more test speeds,
    wherein the processor is configured to execute code to compare the plurality of distances to one or more reach envelopes to determine whether an intrusion into any of the one or more reach envelopes exists along the ride path,
    wherein the test vehicle comprises the ride vehicle configured to carry at least one passenger during operation of the park ride or an unmanned aerial vehicle (UAV) operated to follow the ride path, and
    wherein the reach envelope inspection assembly is removably mounted to the test vehicle.

2. The system of claim 1, wherein the test vehicle comprises the ride vehicle, and wherein the one or more test speeds match ride speeds for the park ride on the ride path.

3. The system of claim 1, wherein the distance measurement assembly is configured to scan a plane orthogonal to a longitudinal axis of the test vehicle when measuring the plurality of distances between the distance measurement assembly and surfaces of the physical environment.

4. The system of claim 1, wherein the distance measurement assembly comprises at least one of a LIDAR sensor, a laser scanner, an ultrasonic distance sensor, a radar sensor, or a camera.

5. The system of claim 1, wherein the processor is further configured to execute code to select a first reach envelope of the one or more reach envelopes, for use in comparing the plurality of distances to the one or more reach envelopes, wherein the first reach envelope is selected based on a location of the test vehicle along the ride path when the plurality of distances were obtained by the distance measurement assembly.

6. A system for inspecting intrusions into a reach envelope of a ride vehicle of a park ride, the system comprising:
    a test vehicle configured to travel along a ride path at one or more test speeds;
    a reach envelope inspection assembly comprising a distance measurement assembly and a processor; and
    a wayside inspection assembly adjacent the ride path including a sensor configured to capture an inspection result,
    wherein the distance measurement assembly is configured to measure a plurality of distances between the distance measurement assembly and surfaces of a physical environment of the park ride while the test vehicle travels along the ride path at the one or more test speeds,
    wherein the processor is configured to execute code to compare the plurality of distances to one or more reach envelopes to determine whether an intrusion into any of the one or more reach envelopes exists along the ride path,
    wherein the test vehicle comprises the ride vehicle configured to carry at least one passenger during operation of the park ride or an unmanned aerial vehicle (UAV) operated to follow the ride path, and
    wherein the processor is configured to determine whether the intrusion into any of the one or more reach envelopes exists along the ride path further based on the inspection result.

7. The system of claim 6, wherein the sensor comprises a camera configured with a focal length based on a first reach envelope of the one or more reach envelopes.

8. The system of claim 6, wherein the sensor comprises a camera, wherein the wayside inspection assembly further includes a light source configured to illuminate at least a portion of a section of the ride path, and wherein the camera is focused on the section of the ride path.

9. The system of claim 1, wherein the reach envelope inspection assembly is a self-contained unit including a power supply.

10. A method for inspecting intrusions into a reach envelope of a ride vehicle of a park ride, the method comprising:

moving a test vehicle, supporting a reach envelope inspection assembly, along a ride path at one or more test speeds;

during the moving of the test vehicle, operating a distance measurement assembly of the reach envelope inspection assembly to measure a plurality of distances between the distance measurement assembly and surfaces of a physical environment of the park ride; and comparing the plurality of distances to one or more reach envelopes to determine whether an intrusion into any of the one or more reach envelopes exists along the ride path, wherein the test vehicle comprises the ride vehicle configured to carry at least one passenger during operation of the park ride or an unmanned aerial vehicle (UAV) operated to follow the ride path, and wherein the reach envelope inspection assembly is removably mounted to the test vehicle.

11. The method of claim 10, further comprising indicating, on a graphical user interface (GUI) displayed on a display device, a location of the intrusion into any of the one or more reach envelopes along the ride path.

12. The method of claim 10, further comprising:
operating a wayside inspection assembly, provided at a position off of the ride vehicle, to capture an inspection result using a sensor,
wherein determining whether the intrusion into any of the one or more reach envelopes exists along the ride path is further based on the inspection result.

13. The method of claim 10, wherein the one or more reach envelopes comprise a first reach envelope and a second reach envelope, the first reach envelope being larger in size than the second reach envelope.

14. The method of claim 13, wherein comparing the plurality of distances to the one or more reach envelopes comprises:
comparing distances measured by the distance measurement assembly along a first portion of the ride path to the first reach envelope; and
comparing distances measured by the distance measurement assembly along a second portion of the ride path to the second reach envelope.

15. The method of claim 14, wherein:
the test vehicle moves at a first speed along the first portion of the ride path,
the test vehicle moves at a second speed along the second portion of the ride path, and
the second speed is higher than the first speed.

16. The method of claim 10,
wherein the test vehicle comprises the ride vehicle, and the one or more test speeds match ride speeds for the park ride on the ride path, or
wherein the test vehicle comprises the UAV, and the method further comprises causing the UAV to slow or hover in response to determining the intrusion into the one or more reach envelopes exists.

17. A system for inspecting intrusions into a reach envelope of a ride vehicle of a park ride, the system comprising:
a test vehicle configured to travel along a ride path at one or more test speeds; and
a reach envelope inspection assembly comprising a distance measurement assembly and a processor,
wherein the distance measurement assembly is configured to measure a plurality of distances between the distance measurement assembly and surfaces of a physical environment of the park ride while the test vehicle travels along the ride path at the one or more test speeds,
wherein the processor is configured to execute code to compare the plurality of distances to one or more reach envelopes to determine whether an intrusion into any of the one or more reach envelopes exists along the ride path, and
wherein the test vehicle comprises an unmanned aerial vehicle (UAV) configured to fly along the ride path.

18. The system of claim 17, wherein the UAV is configured to slow or hover in response to the processor determining the intrusion into the one or more reach envelopes exists.

19. The system of claim 17, wherein the distance measurement assembly is configured to scan a plane orthogonal to a longitudinal axis of the test vehicle when measuring the plurality of distances between the distance measurement assembly and surfaces of the physical environment.

* * * * *